(12) United States Patent
Blohowiak et al.

(10) Patent No.: US 9,334,407 B2
(45) Date of Patent: *May 10, 2016

(54) SOL-GEL COATING METHOD AND COMPOSITION

(71) Applicant: THE BOEING COMPANY, Chicago, IL (US)

(72) Inventors: Kay Y. Blohowiak, Issaquah, WA (US); Jacob W. Grob, Kent, WA (US); Joseph H. Osborne, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/078,624

(22) Filed: Nov. 13, 2013

(65) Prior Publication Data

US 2014/0142218 A1    May 22, 2014

Related U.S. Application Data

(63) Continuation of application No. 11/558,016, filed on Nov. 9, 2006, now Pat. No. 8,592,042.

(51) Int. Cl.
| | |
|---|---|
| *B32B 9/04* | (2006.01) |
| *B32B 15/08* | (2006.01) |
| *C04B 9/02* | (2006.01) |
| *C09D 5/08* | (2006.01) |
| *C09D 4/00* | (2006.01) |
| *C23C 18/12* | (2006.01) |
| *C23C 22/74* | (2006.01) |

(52) U.S. Cl.
CPC .. *C09D 5/08* (2013.01); *C09D 4/00* (2013.01); *C09D 5/086* (2013.01); *C23C 18/122* (2013.01); *C23C 18/1216* (2013.01); *C23C 18/1241* (2013.01); *C23C 18/1254* (2013.01); *C23C 22/74* (2013.01); *C23C 2222/20* (2013.01); *Y10T 428/256* (2015.01); *Y10T 428/31612* (2015.04); *Y10T 428/31663* (2015.04)

(58) Field of Classification Search
CPC ........ C09D 4/00; C09D 5/086; C09D 163/00; C09D 5/08; C09D 183/06; C09D 183/14; C09D 133/062; C09D 183/04; C09D 1/00; C09D 5/1618; C09D 5/1675; C23C 18/1216; C23C 18/1254; C23C 18/122; C23C 18/01
USPC ........... 428/447, 315.5, 304.4, 336, 429, 472, 428/450, 328; 106/287.1, 287.19, 287.13, 106/14.13, 14.12, 14.14; 524/398; 528/25, 528/431

See application file for complete search history.

(56) References Cited

U.S. PATENT DOCUMENTS

| | | | | |
|---|---|---|---|---|
| 5,958,578 A | * | 9/1999 | Blohowiak et al. | ........... 428/336 |
| 6,605,365 B1 | * | 8/2003 | Krienke et al. | ............... 428/472 |
| 6,733,837 B1 | | 5/2004 | Dees | |
| 6,768,048 B2 | | 7/2004 | Woll et al. | |
| 2003/0024432 A1 | | 2/2003 | Chung et al. | |
| 2004/0107989 A1 | | 6/2004 | Woll et al. | |

FOREIGN PATENT DOCUMENTS

| | | |
|---|---|---|
| DE | 102006003956 A1 | 8/2007 |
| EP | 1367146 A | 12/2003 |
| FR | 2886309 A | 12/2006 |
| WO | 9713730 A | 4/1997 |
| WO | 9717144 A | 5/1997 |
| WO | 2005078026 A1 | 8/2005 |
| WO | 2007003828 A2 | 1/2007 |

\* cited by examiner

*Primary Examiner* — James J Seidleck
*Assistant Examiner* — S. Camilla Pourbohloul
(74) *Attorney, Agent, or Firm* — Patterson & Sheridan, LLP

(57) ABSTRACT

A coating composition and a method for coating metallic substrates, such as aircraft components exposed to elevated temperatures and/or oxidative conditions. The coating composition includes an aqueous mixture having about 2 vol % to about 50 vol % organosilane, about 0.3 to about 25 vol % metal alkoxide, and about 0.1 to about 30 vol % organic complexing agent. The coating composition may be deposited on a metallic substrate and cured to form a sol-gel coating on the surface of the substrate that is adherent to the substrate, and oxidation and discoloration resistant.

16 Claims, 1 Drawing Sheet

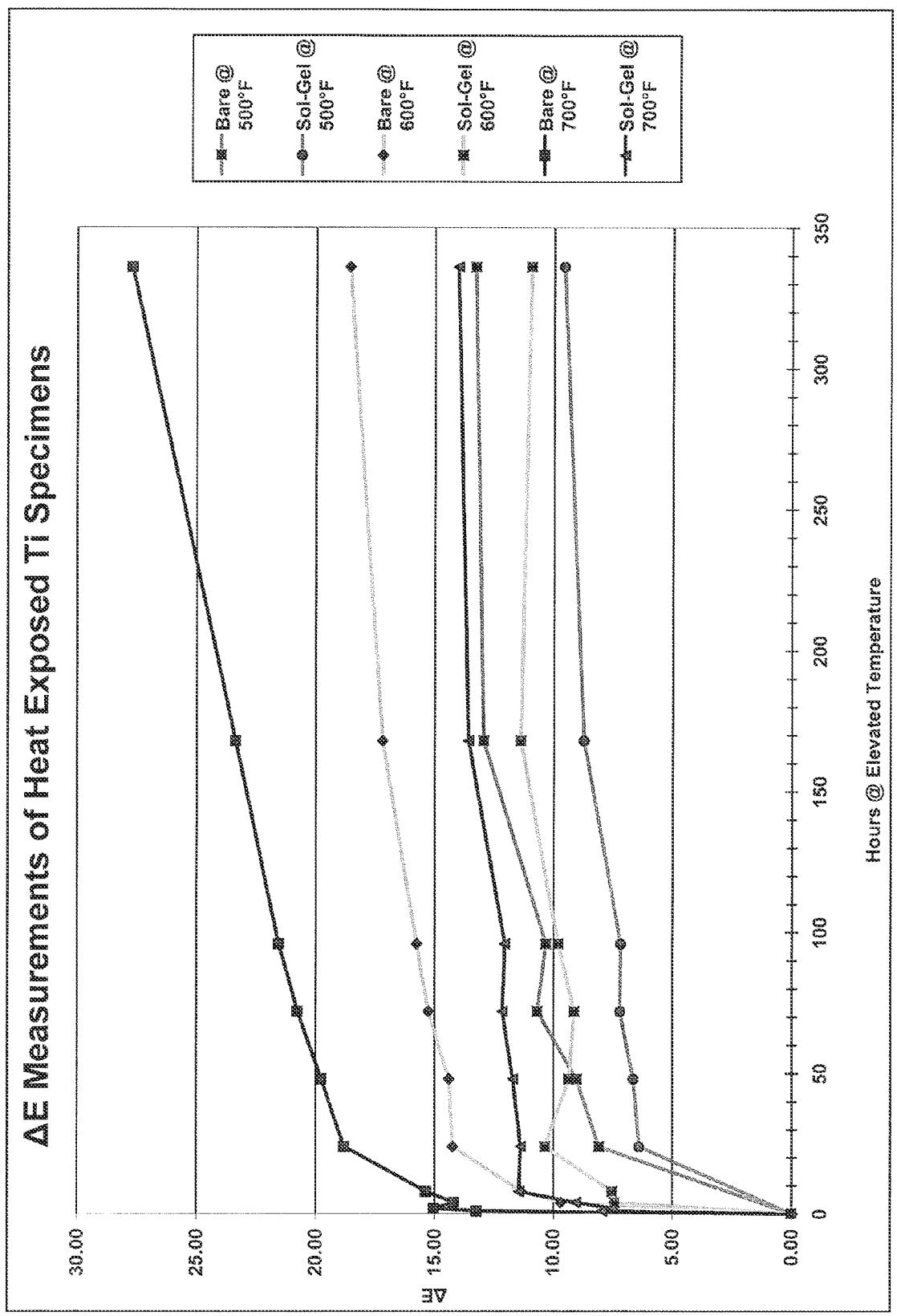

SOL-GEL COATING METHOD AND COMPOSITION

CROSS-REFERENCE TO RELATED APPLICATIONS

This application claims priority from and the benefit of U.S. Nonprovisional application Ser. No. 11/558,016, entitled SOL-GEL COATING METHOD AND COMPOSITION, filed Nov. 9, 2006.

FIELD OF THE INVENTION

The present invention is directed to sol-gel coating compositions and methods for making and using oxidation resistant sol-gel coatings.

BACKGROUND OF THE INVENTION

Some metallic components of aircraft bodies exposed to higher temperature undesirably oxidize and become discolored. For example, aircraft utilizing titanium tailcones handling exhausts from auxiliary power units, are exposed to temperatures sufficient to oxidize the surface and turn it to a color typically ranging from a yellow straw or deep gold to blue or purple. This discoloration is not aesthetically pleasing and conventional paints lack the ability to withstand the temperatures experienced by the tailcone. In addition, manual handling of such components, such as manipulations or contact by service technicians or aircraft personnel and/or handling during manufacturing, frequently result in undesirable staining and/or discoloration, due to fingerprints or other surface contaminants.

Some known coating processes provide some corrosion protection; however, these processes typically use strong acids or strong bases and toxic materials (especially heavy metals such as chromates), these surface treatment processes are disadvantageous from an environmental viewpoint. For example, these processes require significant amounts of water to rinse excess process solutions from the treated parts. The rinse water and spent process solutions must be treated to remove dissolved metals prior to their discharge or reuse. Removing the metals generates additional hazardous wastes that are challenging to cleanup and dispose. Controlling exposure of workers to the hazardous process solutions during either tank or manual application requires special control and exposure monitoring equipment that increases the process cost. These measures greatly increase the cost of using these types of chemical processes.

One method utilized to provide oxidation resistance includes application of paint. Paints are commonly used to protect a surface and to provide color, gloss, reflectivity, or the like on a substrate. Paints generally disperse metal or ceramic pigments and a binder in a water or organic vehicle to form a film when dried on a surface. Typically, the binder is an organic resin. Therefore, paints are generally useable only at relatively low temperatures. They can be difficult to apply uniformly. They are relatively heavy and are expensive to repair. In addition, harsh environments, such as high temperatures, degrade typical organic resins.

What is needed is a coating and method of coating that provides protection against oxidation that renders metallic surfaces resistant to discoloration when exposed to high temperatures, such as the temperatures present in the exhaust of the auxiliary power unit of an aircraft, is less hazardous to the environment and is easily applied, requiring little excess heating and/or expensive processing equipment and/or techniques.

SUMMARY OF THE INVENTION

The present invention is a surface treatment or coating for metal surfaces, especially aluminum or titanium alloys, using a sol-gel film to protect the surface against oxidation and discoloration due to high temperature exposure and/or manual handling.

An aspect of the present invention includes a coating composition and a method for coating metallic substrates, such as aircraft components exposed to temperature up to about 700° F. The coating composition includes an aqueous mixture having about 2 vol % to about 50 vol % organosilane, about 0.3 to about 25 vol % metal alkoxide, and about 0.1 to about 30 vol % organic complexing agent. The coating composition may be deposited on a metallic substrate and cured to form a sol-gel coating on the surface of the substrate that is adherent to the substrate, and oxidation and discoloration resistant.

Another aspect of the present invention includes a metallic aircraft component, such as a tailcone, having an adherent sol-gel coating disposed on a surface thereof. The sol-gel coating is formed by curing an aqueous mixture of about 2 vol % to about 50 vol % organosilane, about 0.3 vol % to about 25 vol % metal alkoxide; and about 0.1 vol % to about 30 vol % complexing agent, the composition having a total volume percent of components of the aqueous composition less than about 50 vol %. In addition, the sol-gel coated aircraft component is resistant to oxidation and discoloration.

An advantage of an embodiment of the present invention is that the surface treatment provides excellent protection against oxidation and discoloration, while retaining the metallic appearance of the underlying substrate.

Another advantage of an embodiment of the present invention is that the sol-gel coating applied is thin and does not add substantial weight or airflow obstruction to treated aircraft components. In addition, in one embodiment of the invention, the glass-like surface of the sol-gel coating may reduce airflow obstruction with respect to a bare, metallic surface.

Still another advantage of an embodiment of the present invention is that the method does not utilize toxic and/or hazardous material, permitting easier handling and decreased impact to the environment.

Still another advantage of an embodiment of the present invention is that the method may be cured at room temperature or low temperatures, allowing the use of portable equipment and reduced labor and energy costs.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 shows a graphical illustration showing hours at elevated temperature versus discoloration in $\Delta E$.

DETAILED DESCRIPTION OF THE INVENTION

Sol coating of metals achieves oxidation resistance and resistance to staining from high temperatures, fingerprints or other contaminants, while minimizing environmental impacts otherwise caused by the traditional use of diluted hazardous metals containing coating compositions. A preferred sol for making the sol coating (also called a sol-gel film) on a metal substrate includes a zirconium alkoxide compound (such as tetra-n-propoxyzirconium) to bond covalently to the metal substrate through the Zr of the alkoxide compound and an organosilane (such as 3-glycidoxypropyltrimethoxysilane) to form the balance of the coating.

The term "sol-gel" as used herein refers to a solid coating that is a mixture of metal oxides and silane coupling agents or to the aqueous solution of the reactive metal alkoxide precursors from which the coating develops via the sol-gel process. The sol-gel process is a series of reactions where, first, a soluble metal species (typically a metal alkoxide or metal salt) hydrolyzes to form metal hydroxide species which then, through condensation reactions, form solid particles and/or gel networks. The soluble metal species usually contains organic ligands tailored to correspond with the resin in the bonded structure. The metal hydroxides condense (i.e., peptize) in solution to form a hybrid organic/inorganic polymer. Depending on reaction conditions, the metal polymers may condense to colloidal particles or they may grow to form a network gel. The ratio of organic to inorganic components in the polymer matrix is controlled to maximize performance for a particular application.

The present invention includes a composition for forming the sol-gel film on the surface. The sol-gel mixture is preferably an aqueous mixture having about 2 vol % to about 50 vol % organosilane, about 0.3 to about 25 vol % metal alkoxide, and about 0.1 to about 30 vol % organic complexing agent. In addition, the total volume percent of the components in the aqueous coating composition is preferably less than about 50 vol. The molar ratio of Zr to Si is preferably about 1:1 to about 1:10, more preferably about 1:3.5. The balance of the aqueous mixture includes water and may further include a surfactant and/or other coating additives known in the art. Water present in the coating composition is preferably deionized water. A portion of the water may be replaced with other solvents that provide desirable properties or processing characteristics to the composition.

Suitable alkoxide compounds for use with the sol-gel coating composition according to an embodiment of the present invention includes metallic alkoxide compounds that have an organo moiety preferably include an aliphatic or alicyclic, such as a lower n-alkoxy moiety having 2-8 carbon atoms. Suitable alkoxide compounds include those having the general formula $Zr(R-O)_4$ wherein R is lower aliphatic having 2 to 8 carbon atoms, especially aliphatic (alkyl groups), tetra n-zirconium, as well as branched aliphatic, alicyclic and aryl groups. For example, approximately 70% zirconium n-propoxide in propanol (TPOZ) is suitable for the sol-gel coating formulation in accordance with the present invention. Additionally other metal alkoxides, such as titanates, and yttrium alkoxides, may be utilized as the alkoxide component of the present invention.

Suitable organosilane compounds include, but are not limited to, 3-glycidoxypropyltrimethoxysilane (GTMS). Other suitable organosilanes for making the sol-gel coating include, but are not limited to, tetraethylorthosilicate, 3-aminopropyltriethoxysilane, 3-glycidoxy-propyltriethoxysilane, p-aminophenylsilane, p or m-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl)methyldiethoxysilane, 3-glycidoxypropyltrimethoxysilane, 2-(3,4-epoxycyclohexyl)ethyltriethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, vinyltrimethoxysilane and combinations thereof.

A complexing agent is also preferably added to the sol-gel mixture. The complexing is preferably an organic acid, such as acetic acid. Other suitable complexing agents for use with the sol-gel mixture, include, but are not limited to organic acids, such as oxalic acid, citric acid, acetylacetonates, glycols, ethoxyethanol, $H_2NCH_2CH_2OH$ (ethanolamine), or other organic acid complexing agents.

Optionally, the sol-gel coating formulation may comprise surfactant. Suitable surfactants include ANTAROX® BL-240 or other surfactant compounds which enhance the wettability of the sol-gel coating. ANTAROX® is a federally registered trademark of GAF Corporation, Wayne, N.J. for surface active chemicals.

Other additives, such as pigments, metallic flakes or other coating additives may be added to the sol-gel mixture. For example, the sol-gel may be provided with pigments to provide desired color, gloss, reflectivity, conductivity, emissivity, or the like.

One embodiment of the invention includes a sol-gel coating composition having about 11.21 vol % 3-glycidoxypropyltrimethoxysilane, about 5.61 vol % zirconium n-propoxide (70% in propanol), about 2.52 vol % glacial acetic acid, about 0.56 vol % BL-240 surfactant and the balance being about 80.10% deionized water.

The sol-gel film is preferably applied by spraying, brushing, rolling or immersing the metal in or with the sol-gel mixture without rinsing. After application, the sol-gel coating is dried at ambient temperature or heated to a temperature between ambient and 700° F. to complete the sol-gel film formation.

The substrate coated with the sol-gel of the present invention preferably includes a metal or alloy selected from the group consisting of corrosion resistant steel alloys, titanium, titanium alloys, nickel, nickel alloys, aluminum, aluminum alloys, copper, brass, and bronze alloys. In particular, the present invention provides excellent oxidation resistance and resistance to fingerprints and staining on titanium, titanium alloys, corrosion resistant steel, aluminum and aluminum alloys, copper, brass, and bronze alloys. Tailcones and other aircraft components are particularly susceptible to oxidation and discoloration due to exposure of the components to moisture and other corrodants present in the air and/or their exposure to temperatures up to about 700° F. In addition, other components exposed to higher temperature corrodants and are viewable from the exterior of the aircraft include, but are not limited to engine cells or casings or portions of the fuselage exposed to temperatures up to about 1200° F. or higher, including temperatures up to about 1800° F. Furthermore, it is desirable to provide aircraft components that are easily viewed from outside the aircraft, including the tailcone, with a metallic appearance that is substantially free from discoloration. The cured sol-gel coating according to an embodiment of the present invention forms a substantially colorless coating that provides an aesthetically desirable metallic surface. In addition, colorants or opaque pigments may be added to the coating to provide an oxidation resistant surface coating having a desired color. While not so limited, due to the temperature and weight considerations for the tailcone of the aircraft, these components are typically fabricated from lightweight temperature resistant material, titanium or titanium alloys. The metal and/or alloy components may be coated with the sol-gel mixture of the present invention.

Ideally, covalent bonding occurs between the metal surface and the alkoxide in the sol-gel mixture to maintain an adherent coating. The strength and durability of the sol coating depends upon chemical and micro-mechanical interactions at the surface involving, for example, the metal's porosity and microstructure and on the susceptibility of the sol coating to rehydrate. Mechanical interactions may also play a role depending on the design (i.e., porosity, microstructure) of the substrate or the sol coating. Durability of the sol-gel film in humid conditions may depend on whether the film rehydrates.

Sol-gel coatings according to an embodiment of the present invention have a cured thickness of about 0.25-25 microns thick, preferably 1-10 microns thick and more preferably 5-10 microns thick. If the film is too thick, the coating begins to exhibit glassy characteristics. In addition, excessively thick coatings exhibit reduced adherence to the substrate and may be subject to spalling.

Surface preparation may be performed to improve the bond with the metallic substrate. The coating according to an embodiment of the present invention preferably is provided to a clean and chemically active metal surface to bond a sol-gel film from the sol-gel by spraying, brushing, rolling or immersing. Cleaning may be provided to the surface to improve adhesion. Bonding may be blocked by contaminating films or soils or bonding may occur between the sol-gel and the contaminants rather than between the sol-gel and the surface. Further, desmutting, etching and/or deoxidation may be provided to chemically activate the surface. Such steps may be desirable for metallic surfaces having native oxide layers. These steps may be provided by any suitable method known for chemically or mechanically activating metallic surface in preparation for coating.

Reaction conditions (for example, concentration of reagents and catalyst type) control the relative rates of the hydrolysis and condensation reactions. Sol-gel solutions can be prepared which readily form thin films or which condense to fine colloidal particles. Density, porosity, and microstructure can be tailored by controlling the chemistry of the sol-gel coating solution. For example, increasing or decreasing the concentrations of particular reagents and/or controlling the conditions of the curing step may achieve control of the chemistry.

The alkoxide, organosilane and organic complexing agent are combined into an aqueous mixture. As discussed above, the present invention preferably includes an aqueous sol-gel coating composition having about 2 vol % to about 50 vol % organosilane, about 0.3 to about 25 vol % metal alkoxide, and about 0.1 to about 30 vol % organic complexing agent. In addition, the total volume percent of the components in the aqueous coating composition is preferably less than about 50%. The balance of the aqueous mixture includes water and may further include a surfactant and/or other coating additives known in the art. The aqueous sol-gel coating solution is preferably deposited on the metallic surface by spraying, immersing, rolling, brushing, or any other suitable application method. The aqueous mixture is then cured to form the sol-gel coating. The curing step preferably takes place by exposing the mixture to a temperature of about room temperature to about 700° F. for 1 minute to about 24 hours. More preferably, the curing takes place at about 180° F. for about 1 to about 2 hours. The curing temperature may be selected to provide the desired densification of the resultant coating. Higher coating temperatures create a more dense coating, wherein curing temperatures at and greater than about 700° F. form a substantially ceramic coating. Lower coating temperatures create a coating that is sufficiently dense to resist oxidation and remains adherent to the substrate surface.

EXAMPLE

Example 1

A sol-gel coating composition was prepared by providing to a vessel a mixture 11.21 vol % 3-glycidoxypropyltrimethoxysilane, 5.61 vol % zirconium n-propoxide (70% in propanol), 2.52 vol % glacial acetic acid, about 0.56 vol % BL-240 surfactant and a balance of the mixture being 80.10% deionized water. The components were combined and blended in the vessel to provide a blended mixture. The mixture was then sprayed onto a titanium surface and the coating was heated to a temperature of 180° F. for 1.5 hours. The coating formed was highly adherent to the surface and resistant to both oxidation and discoloration at temperature up to about 700° F. Color change, measured in $\Delta E$, was measured on titanium samples treated according to Example 1 and bare titanium samples over time at elevated temperatures of 500° F., 600° F. and 700° F., the results of which are shown in FIG. 1.

Example 2

Example 2 utilized the sol-gel components in the amounts utilized for Example 1, wherein 10% by weight of Ni flake or stainless flake was additionally added to the sol-gel composition. The mixture was then sprayed onto a titanium surface and the coating was heated to a temperature of 180° F. for 1.5 hours. The coating formed was highly adherent to the surface and resistant to both oxidation and discoloration at temperature up to about 700° F.

Example 3

A sol-gel coating composition was prepared by providing to a vessel a mixture 11.21 vol % tetraethylorthosilicate, 5.61 vol % zirconium n-propoxide (70% in propanol), 2.52 vol % glacial acetic acid, about 0.56 vol % BL-240 surfactant and a balance of the mixture being 80.10% deionized water. The components were combined and blended in the vessel to provide a blended mixture. The mixture was then sprayed onto a titanium surface and the coating was heated to a temperature of 180° F. for 1.5 hours. The coating formed was highly adherent to the surface and resistant to both oxidation and discoloration at temperature up to about 700° F.

Example 4

A sol-gel coating composition was prepared by providing to a vessel a mixture 11.21 vol % 3-aminopropyltrimethoxysilane, 5.61 vol % zirconium n-propoxide (70% in propanol), 2.52 vol % glacial acetic acid, about 0.56 vol % BL-240 surfactant and a balance of the mixture being 80.10% deionized water. The components were combined and blended in the vessel to provide a blended mixture. The mixture was then sprayed onto a titanium surface and the coating was heated to a temperature of 180° F. for 1.5 hours. The coating formed was highly adherent to the surface and resistant to both oxidation and discoloration at temperature up to about 700° F.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An aqueous sol-gel coating composition for coating a metallic aircraft component comprising:
   an organosilane,
   a metal alkoxide; and
   an organic complexing agent;
   wherein the metal alkoxide is a compound having the general formula $Zr(R-O)_4$; wherein R is a lower linear or branched aliphatic, alicyclic or aryl moiety having 2 to 8 carbon atoms;
   wherein the complexing agent is selected from the group consisting of acetic acid, oxalic acid, citric acid, acetylacetonates, glycols, ethoxyethanol, ethanolamine, and combinations thereof;
   wherein a ratio of metal alkoxide to organic complexing agent is about 2:1 by volume percent; wherein the coating composition is devoid of pigment and the total volume percent of the components in the aqueous composition is less than about 50% and the composition forming an adherent bond to metallic substrates when cured and providing a cured coating structure resistance to oxidation and discoloration.

2. The composition of claim 1, wherein the organosilane is selected from the group consisting of 3-glycidoxyproplytrimethoxysilane, tetraethylorthosilicate, 3-aminopropyltriethoxysilane, 3-glycidoxy-propyltriethoxysilane, p- or m-aminophenylsilane, allyltrimethoxysilane, n-(2-aminoethyl)-3-aminopropyltrimethoxysilane, 3-aminopropyltriethoxysilane, 3-aminopropyltrimethoxysilane, 3-glycidoxypropyldiisopropylethoxysilane, (3-glycidoxypropyl) methyldiethoxysilane, 3-glycidoxypropyltrimethoxysilane, 2-(3,4-epoxycyclohexyl)ethyltriethoxysilane, 3-mercaptopropyltrimethoxysilane, 3-mercaptopropyltriethoxysilane, 3-methacryloxypropylmethyldiethoxysilane, 3-methacryloxypropylmethyldimethoxysilane, 3-methacryloxypropyltrimethoxysilane, n-phenylaminopropyltrimethoxysilane, vinylmethyldiethoxysilane, vinyltriethoxysilane, vinyltrimethoxysilane and combinations thereof.

3. The composition of claim 1, wherein the organosilane comprises 3-glycidoxyproplytrimethoxysilane.

4. The composition of claim 1, wherein the alkoxide is zirconium n-propoxide (70% in propanol).

5. The composition of claim 1, wherein the complexing agent is acetic acid.

6. The composition of claim 1, wherein mixture comprises less than about 50 vol % total organosilane and alkoxide.

7. The composition of claim 1, wherein the composition further comprises a surfactant.

8. The composition of claim 1, wherein water is present in an amount more than any other component in the composition.

9. The composition of claim 8, wherein the water is deionized water.

10. The composition of claim 1, wherein the composition includes water and at least one additional solvent.

11. The composition of claim 1, wherein molar ratio of Zr to Si in the coating composition is about 1:1 to about 1:10.

12. The composition of claim 1, wherein molar ratio of Zr to Si in the coating composition is about 1:3.5.

13. The composition of claim 1, wherein the adherent bond formed when the composition is cured includes covalent bonding between the metallic substrate and the metal alkoxide.

14. The composition of claim 1, wherein the cured coating structure is resistant to both oxidation and discoloration at temperature up to about 700° F.

15. An aqueous sol-gel coating composition for coating a metallic aircraft component comprising:
    3-glycidoxyproplytrimethoxysilane,
    zirconium n-propoxide (70% in propanol); and
    an organic complexing agent;
    wherein a ratio of zirconium n-propoxide to organic complexing agent is about 2:1 by volume percent; wherein the coating composition is devoid of pigment and the total volume percent of the components in the aqueous composition is less than about 50% and the composition forming an adherent bond to metallic substrates when cured and providing a cured coating structure resistance to oxidation and discoloration.

16. An aqueous sol-gel coating composition for coating a metallic aircraft component comprising:
    about 11.21 vol % 3-glycidoxypropyltrimethoxysilane,
    about 5.61 vol % zirconium n-propoxide (70% in propanol),
    about 2.52 vol % glacial acetic acid,
    about 0.56 vol % BL-240 surfactant and the balance essentially deionized water;
    wherein the coating composition is devoid of pigment and the composition forming an adherent bond to metallic substrates when cured and providing a cured coating structure resistance to oxidation and discoloration.

* * * * *